US012236769B1

(12) United States Patent
Benson

(10) Patent No.: US 12,236,769 B1
(45) Date of Patent: Feb. 25, 2025

(54) DECOMPOSITION ALARM DEVICE

(71) Applicant: Jennifer E. Benson, Cleveland, OH (US)

(72) Inventor: Jennifer E. Benson, Cleveland, OH (US)

( * ) Notice: Subject to any disclaimer, the term of this patent is extended or adjusted under 35 U.S.C. 154(b) by 141 days.

(21) Appl. No.: 17/986,089

(22) Filed: Nov. 14, 2022

Related U.S. Application Data

(60) Provisional application No. 63/278,545, filed on Nov. 12, 2021.

(51) Int. Cl.
*G08B 23/00* (2006.01)
*G08B 21/18* (2006.01)

(52) U.S. Cl.
CPC ............. *G08B 21/18* (2013.01); *G08B 23/00* (2013.01)

(58) Field of Classification Search
CPC ...................................................... G08B 21/18
See application file for complete search history.

(56) References Cited

U.S. PATENT DOCUMENTS 4,162,289 A * 7/1979 Gomez ..................... A61L 9/00 422/4
4,375,637 A * 3/1983 Desjardins ........... G08B 26/006 379/49
5,309,145 A * 5/1994 Branch ................ G08B 19/005 340/567
6,292,687 B1 9/2001 Lowell et al.
6,593,142 B2 7/2003 Kelly et al.
6,924,147 B2 8/2005 Kelly et al.
7,560,271 B2 7/2009 Leech et al.
8,017,352 B2 9/2011 Leech et al.
8,981,926 B2 3/2015 Al-Ali
9,131,892 B2 9/2015 Markel
9,572,528 B1 2/2017 Chang
10,262,525 B2 * 4/2019 Carlin .................... H05B 47/12
10,458,637 B1 * 10/2019 Liu .......................... F21V 29/70
11,172,339 B1 * 11/2021 Hummer ................. H04W 4/38
11,244,554 B1 * 2/2022 Volodymyrovych .. G08B 25/14
2005/0190067 A1 * 9/2005 Black ................... G08B 17/113 340/628
2006/0042530 A1 * 3/2006 Bodycomb .............. A01C 7/00 111/200
2007/0124427 A1 * 5/2007 Light .................... H04M 3/387 709/218
2011/0187543 A1 * 8/2011 Russo .................... G08B 17/10 340/628
2017/0084156 A1 * 3/2017 Myllymäki ............ G08B 17/10
2018/0082685 A1 * 3/2018 Carlin .................. H05B 47/105
2018/0106048 A1 * 4/2018 Staton ..................... E04F 13/18
2018/0266163 A1 * 9/2018 Combe .................. G08B 17/10
(Continued)

*Primary Examiner* — Steven Lim
*Assistant Examiner* — Son M Tang
(74) *Attorney, Agent, or Firm* — Cramer Patent & Design, PLLC.; Aaron R. Cramer

(57) ABSTRACT

A decomposition alarm device has an enclosure having a conventional smoke detector shape, a first side of the enclosure having a mounting tab to mount the enclosure on a vertical surface, and a front face of the enclosure having a sound grille to allow sound from inside the enclosure to exit the enclosure. The device is calibrated to detect the presence of a decomposing body and emit an audible and visual alarm. This device prevents the remains of a decomposing body going unnoticed by other inhabitants in a household or building.

2 Claims, 5 Drawing Sheets

(56) References Cited

U.S. PATENT DOCUMENTS

| | | | | |
|---|---|---|---|---|
| 2019/0172333 | A1* | 6/2019 | Combe | G08B 21/16 |
| 2019/0210053 | A1* | 7/2019 | Cheng | B05B 9/03 |
| 2020/0160688 | A1* | 5/2020 | Shimadzu | G01N 21/01 |
| 2020/0226914 | A1* | 7/2020 | Lacy | G01N 33/0063 |
| 2021/0204379 | A1* | 7/2021 | Zhang | H05B 47/105 |
| 2021/0222877 | A1* | 7/2021 | Combe | G08B 17/10 |

* cited by examiner

DECOMPOSITION ALARM DEVICE

RELATED APPLICATIONS

The present invention was first described in and claims the benefit of U.S. Provisional Patent Application No. 63/278,545 filed on Nov. 12, 2021, the entire disclosures of which are incorporated herein by reference.

FIELD OF THE INVENTION

The present invention relates generally a sensor and more specifically to a sensor that detects the presence of a decomposed body.

BACKGROUND OF THE INVENTION

In an all-too-often unfortunate occurrence, people often die in their residences with no one else around to take action and alert the authorities. As a result, the media is full of stories of deceased individuals who are not found for days, weeks, months, or in some cases, years. Whether the death is a result of an accident, physiological occurrence, murder, or simply old age, the result is the same, a body that is so badly decomposed that a conventional funeral service cannot occur along with families and friends who must bear the burden of not checking in on them earlier.

As more and more people live on their own, often in remote locations, and personal privacy laws further prevent casual check-ups, the rate of people dying alone is surely likely to rise. Accordingly, there exists a need for a means by which the presence of a dead body can be quickly detected and alerted, such that others may take immediate action. The development of the decomposition alarm device fulfills this need.

SUMMARY OF THE INVENTION

To achieve the above and other objectives, the present invention provides for a decomposition device has an enclosure having a conventional smoke detector shape, a first side of the enclosure having a mounting tab to mount the enclosure on a vertical surface, and a front face of the enclosure having a sound grille to allow sound from inside the enclosure to exit the enclosure.

The enclosure may be made of plastic. The enclosure may be waterproof with enhanced environmental protection in water and in humid environments. The first side of the enclosure may be provided with a date indicator. The date indicator may be a digital display. A pushbutton test switch may be disposed on the front face to allow for self-test of the decomposition device. The vertical surface may be a wall. The front face may include an analog clock face. The analog clock face may be disposed on an interior of the enclosure. An alarm horn may be disposed on adjacent to the analog clock face which produces the audible alert. The front face may include an AM/PM indicator.

The decomposition device may be red in color to distinguish it from a smoke detector, a heat detector, or a carbon monoxide alarm which are white in color. The decomposition device may be red in color to distinguish it from the smoke detector, the heat detector, or the carbon monoxide alarm which are almond in color. The decomposition device is paired wirelessly with a central manned position.

The central manned position may be equipped with an annunciator panel. The annunciator panel may be wirelessly connected to the decomposition device via a radio frequency signal. The central manned position may be selected from the group consisting of a main office, a main desk, or a dispatch. The decomposition device may be operated on one or more batteries to eliminate need for a power cord. The decomposition device may detect a decomposition gas released from a human body selected from the group consisting of hydrogen sulfide, methane, cadaverine, and putrescine. The decomposition device may detect a decomposition gas released from an animal body.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
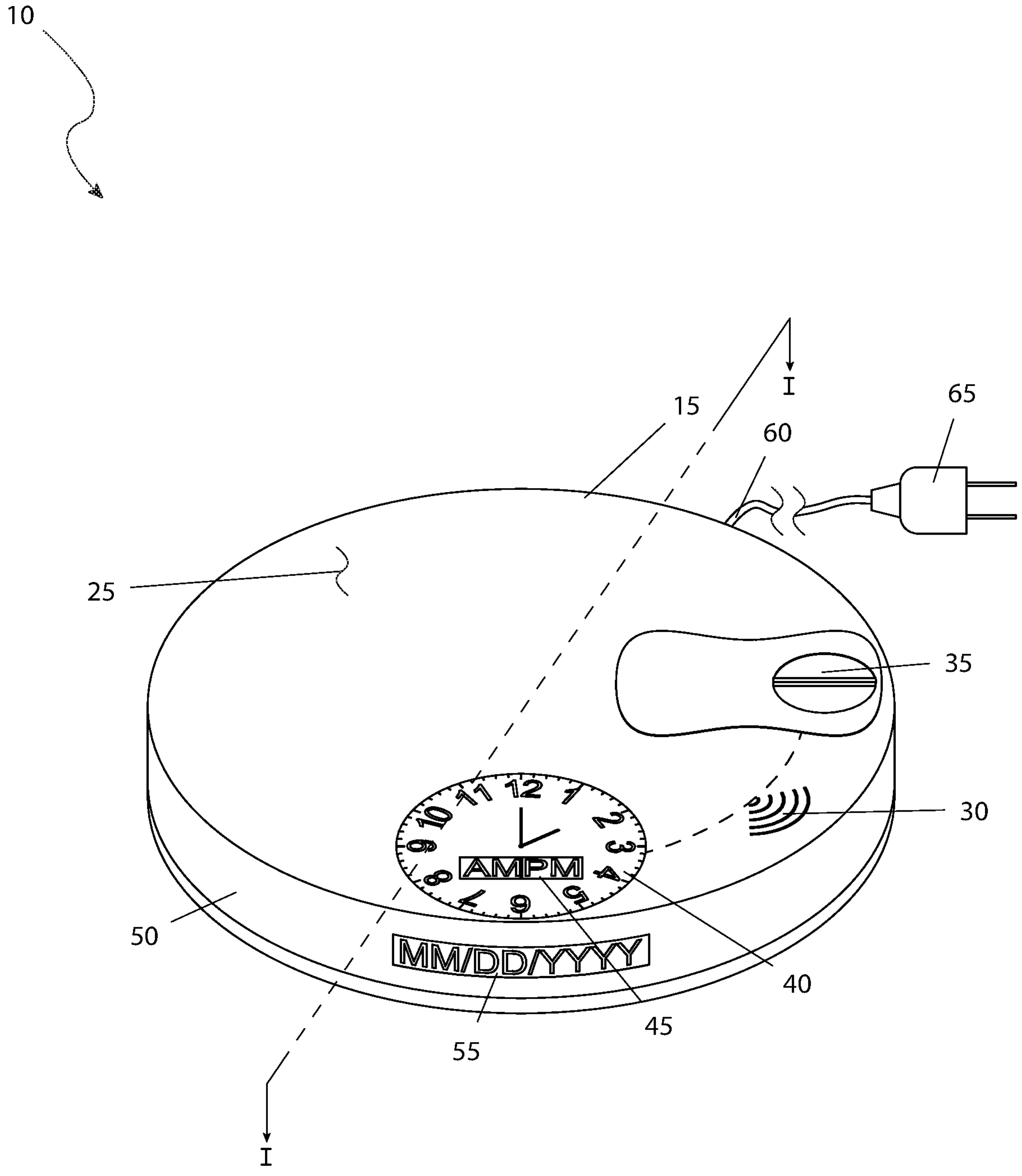
FIG. 1 is a perspective top view of the decomposition alarm device, according to the preferred embodiment of the present invention.

10 decomposition alarm device
15 enclosure
20 mounting tab
25 front face
30 sound grille
35 test switch
40 analog clock face
45 AM/PM indicator
50 side
55 date indicator
60 power cord
65 wall adapter
70 wall
75 dwelling unit
80 AC electrical wall receptacle
85 deceased body
90 decomposition gases
95 audible alert
100 radio frequency (RF) signal
105 multi-unit dwelling
110 central manned position
115 annunciator panel
120 alarm indicator
125 active alarm indicator
130 alarm horn
135 resistor
140 capacitor 145 rechargeable lithium-ion battery
150 ionization chamber
155 radiation detector
160 alarm light 1. Description of the Invention The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a perspective top view of the decomposition alarm device 10, according to the preferred embodiment of the present invention is disclosed. The decomposition alarm device (herein also described as the "device") 10, provides an alarm to alert others of a deceased body 85 emitting decomposition gases 90 in a dwelling unit 75. It is intended to alert a central manned position 110 to prevent a deceased body 85 from being unattended to in days, weeks, or months. The device 10 includes a plastic enclosure 15 which is approximately the same size as a conventional smoke detector (e.g.: five inches (5 in.) in diameter and one inch (1 in.) in height). The enclosure 15 is waterproof to provide the device 10 with enhanced environmental protection in water and in humid environments.

A first side of the enclosure 15 is provided with a mounting tab 20 to enable the device 10 to be mounted on a vertical surface such as a wall. It is envisioned that the device 10 would be red in color to distinguish it from smoke detectors, heat detectors, carbon monoxide (CO) alarms and other similar alarms which are typically white or almond in color. The front face 25 of the enclosure 15 is provided with a sound grille 30 to allow sound from internal contents stored or communicated thereto and capable of producing audible sounds to exit the enclosure 15. A pushbutton test switch 35 to allow for self-test of the device 10 is also located on the front face 25. Finally, the front face 25 has an analog clock face 40 incorporated therein, and further having an AM/PM indicator 45. The side 50 of the enclosure 15 is provided with a date indicator 55, herein illustrated as a digital display showing "August 8, 2018" for purposes of illustration. The device 10 is capable of being in electrical communication with an electrical power supply through a power cord 60 with a wall adapter 65 at its distal end. The wall adapter 65 is capable of being in electrical communication with a conventional AC electrical wall receptacle 80.

Figure 2:
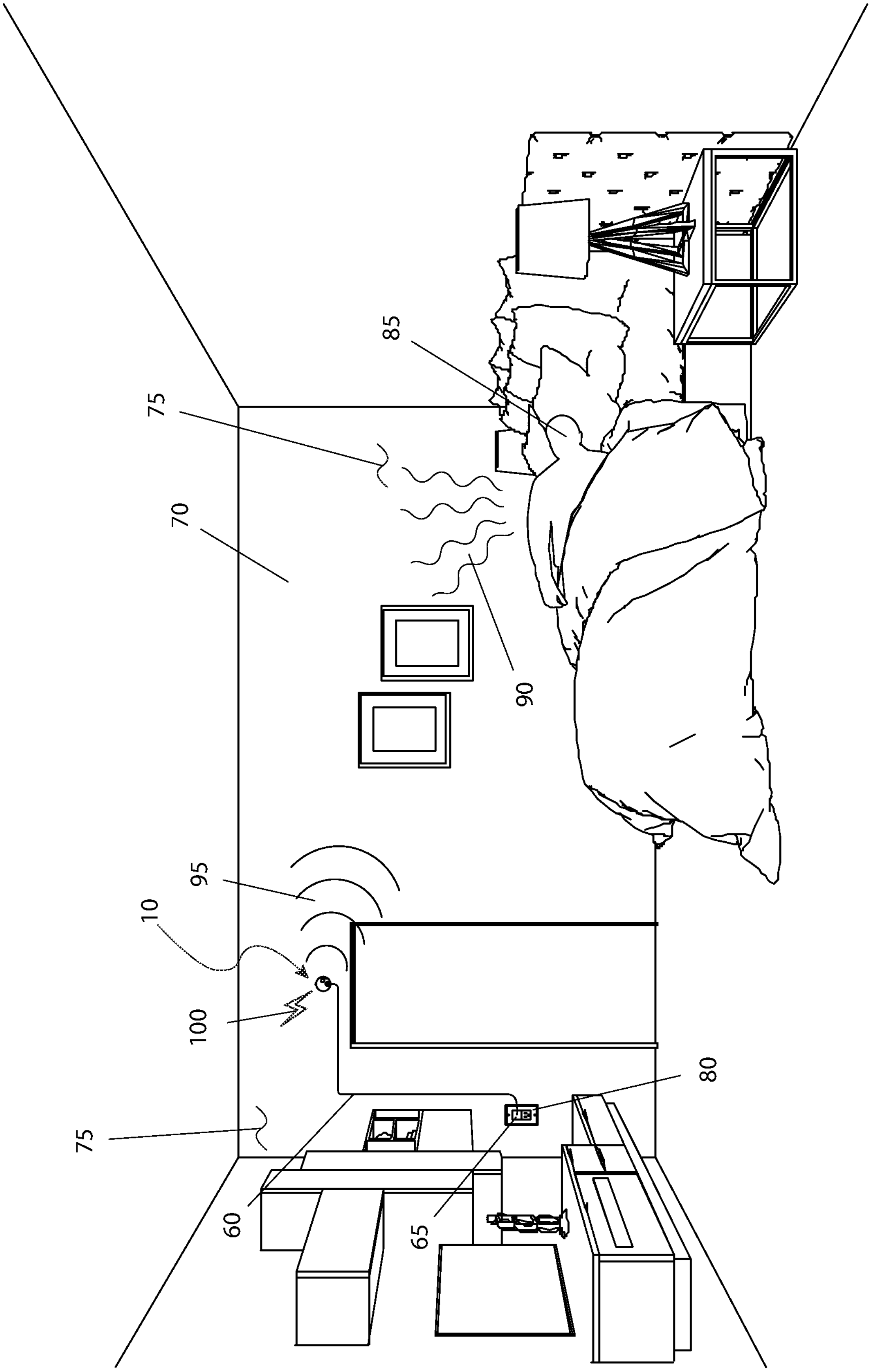
FIG. 2 is a pictorial view of the decomposition alarm device, shown in a utilized state, according to the preferred embodiment of the present invention.

Referring next to FIG. 2, a pictorial view of the device 10, shown in a utilized state, according to the preferred embodiment of the present invention is depicted. The device 10 is particularly well suited when located on a wall 70 of a dwelling unit 75, such as a house, a room, a bedroom, an apartment unit, a hotel room, a dormitory room, or the like. Other intended areas equivalent in function to the dwelling unit 75 include but are not limited to: a public restroom, a workplace, a walk-in freezer, a school, a stadium, an AMT lock, a vehicle, a cruise ship, a train, an airplane, a grocery store, a mall, a post office, a church, a library, a coffee shop, a zoo, a sporting place, and the like. The use of the device 10 in any specific type of dwelling unit 75 is not intended to be a limiting factor of the present invention. The AC electrical wall receptacle 80 receives electrical power from an AC electrical wall receptacle 80 via the power cord 60 and the wall adapter 65. The device 10 can also be paired wirelessly with the central manned position 110 and also can function on batteries to eliminate the need for a power cord 60.

For purposes of illustration, the dwelling unit 75 contains a deceased body 85 who has recently passed, perhaps as a result of carbon monoxide (CO) poisoning, natural causes, murder, slip and fall, or suicide. As part of the normal decomposition process of the human body, various decomposition gases 90 such as hydrogen sulfide (H2S), methane (CH4), cadaverine (NH2(CH2)5NH2), and putrescine (NH2 (CH2) 4NH2) are released from the body of the deceased body 85. These decomposition gases 90 are detected by the device 10 which places the device 10 into an alarm state. Further description of the alarm state will be provided herein below. In the case of use of the device 10 in a single-family dwelling such as a house, the device 10 will produce an audible alert 95 from the sound grille 30 (as shown in FIG. 1) to help alert neighbors, passersby, and the like. In the case of use of the device 10 in a multi-unit dwelling unit, such as an apartment building, hotel, dormitory, or the like, the device 10 also produces a radio frequency (RF) signal 100 for supplemental alerting as will be described herein below, or as a direct alert to local law enforcement as part of a site alarm system for a residence. In other embodiments, the device 10 can distinguish decomposition gases 90 that are produced by a human body 85 or an animal body and alert the central manned position 110 as to the detection thereof.

Figure 3:
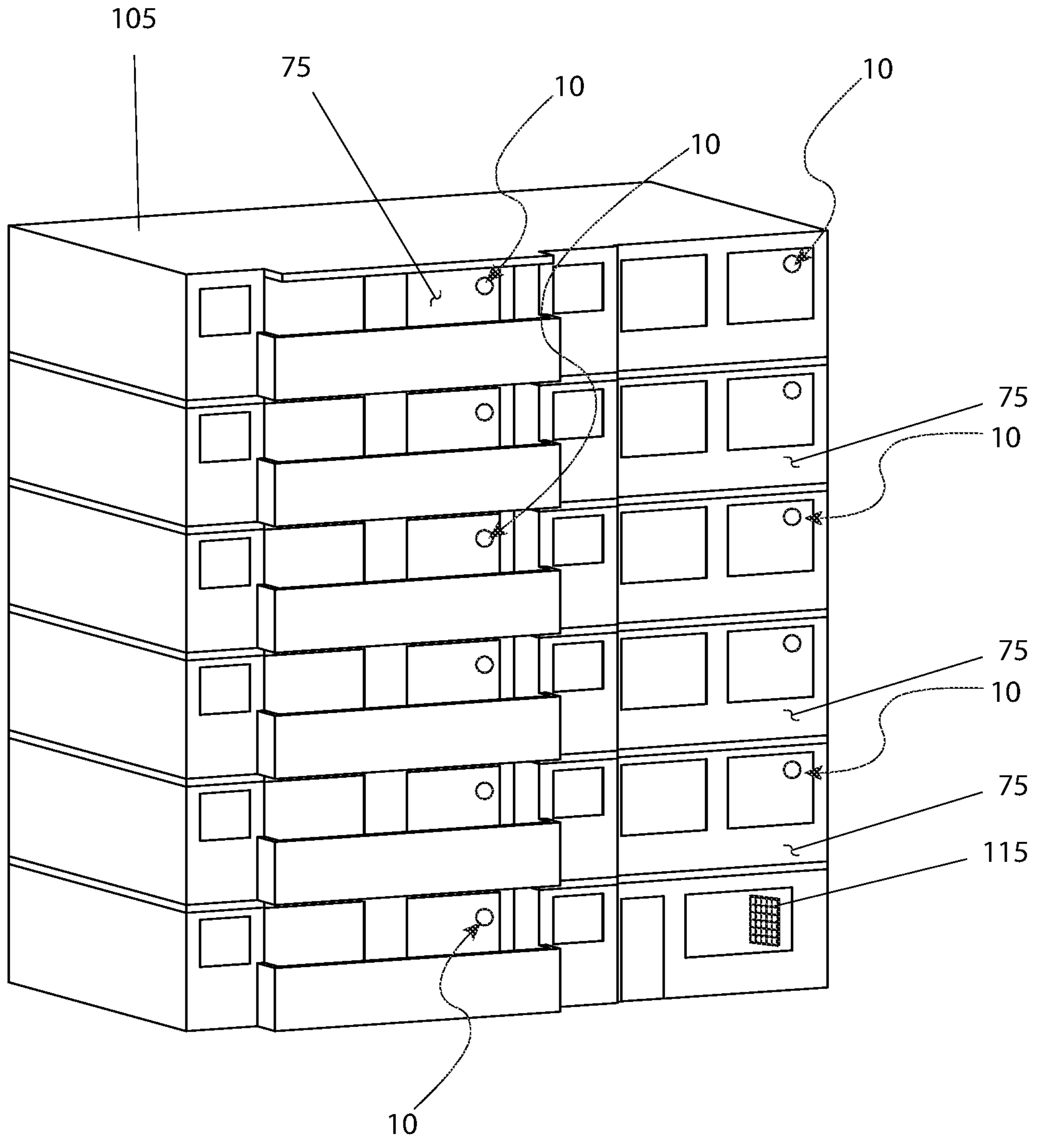
FIG. 3 is a pictorial view of the decomposition alarm device shown in a utilized state in a multi-unit dwelling, according to the preferred embodiment of the present invention.

Referring now to FIG. 3, a pictorial view of the device 10 shown in a utilized state in a multi-unit dwelling 105, according to the preferred embodiment of the present invention is shown. As aforementioned described, the multi-unit dwelling 105 may be an apartment building, hotel, dormitory, or similar. Each dwelling unit 75 is equipped with its own device 10. The multi-unit dwelling 105 is envisioned to be equipped with the central manned position 110 such as a main office, main desk, dispatch, or the like. The central manned position 110 is equipped with an annunciator panel 115 which is wirelessly connected to each device 10 via the radio frequency (RF) signal 100 (as shown in FIG. 2). Should the presence of a deceased body 85 become detected in any of the dwelling unit 75, the annunciator panel 115 will alarm allowing authorized personnel to take corrective action.

Figure 4:
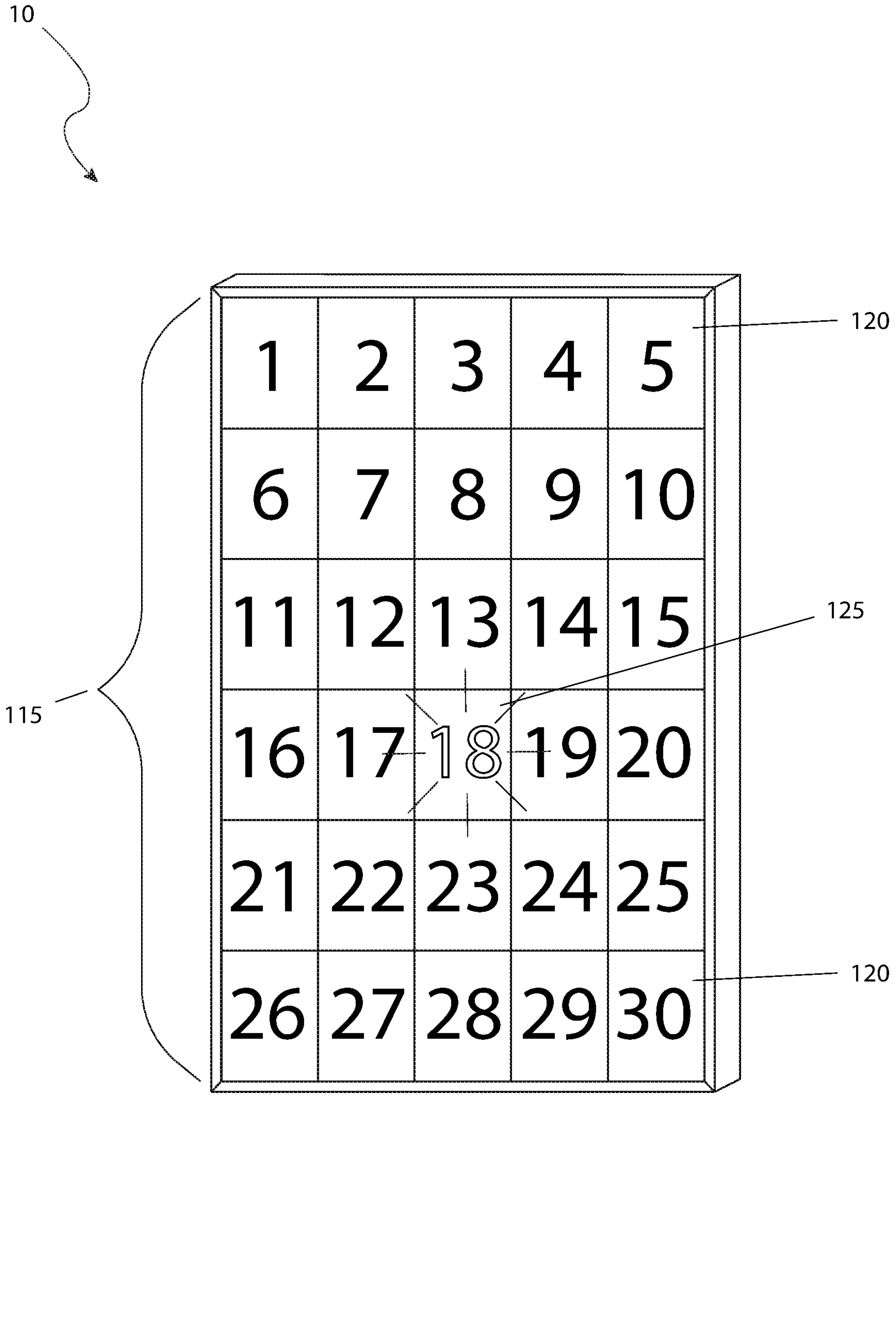
FIG. 4 is a perspective view of the annunciator panel, as used with the decomposition alarm device, according to the preferred embodiment of the present invention.

Referring next to FIG. 4, a perspective view of the annunciator panel 115, as used with the device 10, according to the preferred embodiment of the present invention is disclosed. The annunciator panel 115 would be provided with an independent alarm indicator 120 for each of the device 10 used in the multi-unit dwelling 105 (as shown in FIG. 3). The overall size of the annunciator panel 115 would vary upon the size (quantity) of dwelling unit 75 (as shown in FIGS. 2 and 3). As an example, the annunciator panel 115 as shown in FIG. 4, represents a thirty (30) unit multi-unit dwelling 105, arranged in a five-by-six (5×6) array. An active alarm indicator 125 (herein depicted as unit #18 for illustrative purpose) will be become illuminated as shown. This will alert a supervisor, a desk attendant, a manager, or other staff of the multi-unit dwelling 105 to take appropriate action and alert authorities. The appropriate action is envisioned to be calling an ambulance, a rescue squad, a medical examiner, a mortician or the like. In such a manner, the dead person 85 will be immediately attended to within minutes, versus days, weeks, months, or more as is the case of dwelling unit 75 where the device 10 is not present.

Figure 5:
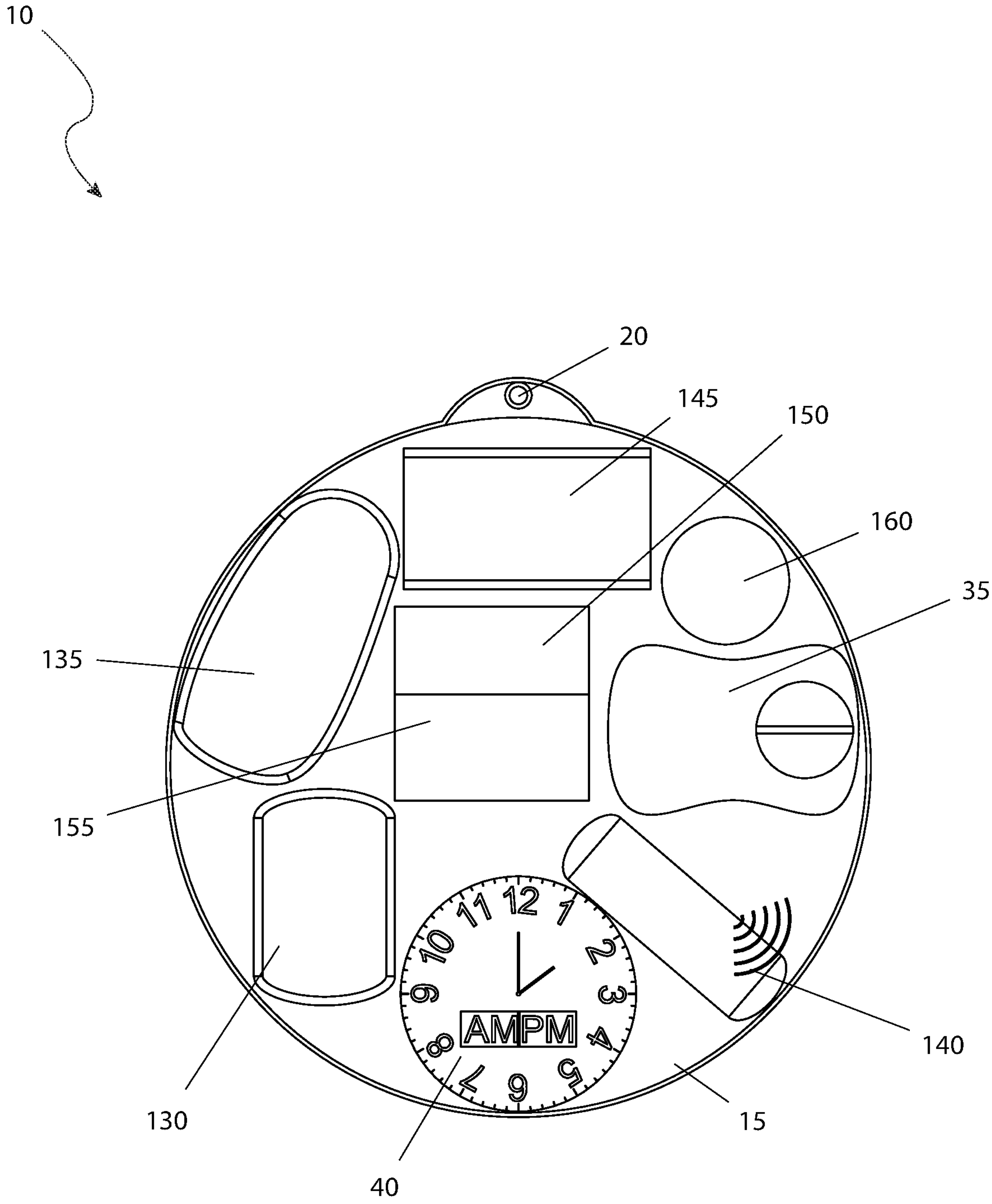
FIG. 5 is a sectional view of the decomposition alarm device, as seen along a line I-I, as shown in FIG. 1, according to the preferred embodiment of the present invention.

Referring to FIG. 5, a sectional view of the device 10, as seen along a line I-I, as shown in FIG. 1, according to the preferred embodiment of the present invention is depicted. The analog clock face 40 is present on both the interior of the plastic enclosure 15 as well as the exterior as shown in FIG. 1. The analog clock face 40 runs as a normal clock during normal operation. However, once decomposition gases 90 (as shown in FIG. 2) are detected, the analog clock face 40 will stop thus documenting the sensing thereof for purposes of determining time of death. An alarm horn 130 is found to the left of the analog clock face 40 which produces the audible alert as emitted through the sound grille 30 (as shown in FIG. 1). The alarm horn 130 is not as loud as a conventional smoke or fire detector so as not disturb or frighten other occupants in a multi-unit dwelling 105 (as shown in FIG. 3). It is also envisioned that the alarm horn 130 would have a unique sound such as that of an "owl" to prevent confusion with other types of alarms such as an alarm clock, timers, smoke detectors, carbon monoxide (CO) detectors, and the like. Resistors 135 keep electrical current in conjunction with capacitors 140. While the device 10 is powered by the power cord 60 and wall adapter 65 (both of which are shown in FIGS. 1 and 2), a rechargeable lithium-ion battery 145 provides power during times of a power outage or brownout. An ionization chamber 150 and a radiation detector 155 are provided in the middle of the enclosure 15 to perform the actual detection of the decomposition gases 90 (as shown in FIG. 2). An alarm light 160 is located to the right of the rechargeable lithium-ion battery 145 which illuminates at the same time as the alarm horn 130 is energized to help identify the operation of the device 10. As aforementioned described, the test switch 35 provides opportunity to test complete operation of the device 10 for verification purposes.

3. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as hardware stores, home improvement stores, automotive supply stores, mechanical supply houses, discount stores, department stores, mail order and internet supply houses and the like. Special attention would be paid to the overall number of dwelling units 75 needed on the annunciator panel 115 in the case of multi-unit dwelling 105 uses.

After procurement and prior to utilization, the device 10 would be prepared in the following manner: the device 10 would be mounted on the wall 70 of a dwelling unit 75 in either a private house or a multi-unit dwelling 105; alternately, the device 10, which may be wireless, can be placed in the desired location, the wall adapter 65 would be connected to a local AC electrical wall receptacle 80, the proper time and date would be set on the analog clock face 40 and the date indicator 55 respectively; and proper operation will be verified by operation of the test switch 35. At this point in time, the device 10 is ready for operation.

During utilization of the device 10, it operates in a simple and transparent manner, passively monitoring the local environment for presence of decomposition gases 90. Upon detection, the following activities occur: the alarm horn 130 is activated to produce an audible alert 95, the date indicator 55 and the analog clock face 40 are deactivated to assist in determining the time of death, a central manned position 110 is produced for alarming at the annunciator panel 115 if provided or for alarming for law enforcement notification. Upon said notification, the deceased body 85 will be investigated and next of kin notified.

In a manner similar to smoke detectors, usage of the device 10 would be envisioned as mandatory in multi-unit dwelling 105. Any rental properties would have a device 10 installed on each level. It is envisioned that landlords would be appreciative of the functionality of the device 10 as damage to furnishings such as carpet, furniture and the like would be reduced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A decomposition alarm device, comprising:

a plastic enclosure having a front face and a side, said enclosure being waterproof for enhanced environmental protection;

a sound grille located on the front face of the enclosure for emitting an audible alert;

an ionization chamber and a radiation detector disposed within the enclosure for detecting decomposition gases emitted by a deceased body;

an analog clock face on the front face of the enclosure, said clock face ceasing operation upon detection of said decomposition gases to document the time of detection;

an alarm horn configured to emit a unique sound distinct from conventional alarms;

a radio frequency (RF) transmitter for sending a wireless signal to a central manned position upon detection of decomposition gases;

a mounting tab on a side of the enclosure to enable mounting of the device on a vertical surface; and, a power supply connection and a rechargeable battery for operation in the event of power failure.

2. The decomposition alarm device of claim 1, further comprising:

an annunciator panel wirelessly connected to the device via said radio frequency transmitter, said annunciator panel having independent alarm indicators for each of a plurality of said decomposition alarm devices installed within a multi-unit dwelling, wherein activation of any decomposition alarm device causes a corresponding alarm indicator on the annunciator panel to illuminate, alerting authorized personnel of the presence of decomposition gases in the respective dwelling unit.

* * * * *